(12) United States Patent
Wallin et al.

(10) Patent No.: US 10,561,940 B2
(45) Date of Patent: Feb. 18, 2020

(54) COMPUTER DEVICE AND METHOD

(71) Applicant: KING.COM LIMITED, St. Julians (MT)

(72) Inventors: Adam Wallin, Stockholm (SE); Sebastien Ballanger, Malmo (SE)

(73) Assignee: KING.COM LTD., St. Julians (MT)

( * ) Notice: Subject to any disclaimer, the term of this patent is extended or adjusted under 35 U.S.C. 154(b) by 903 days.

(21) Appl. No.: 14/958,067

(22) Filed: Dec. 3, 2015

(65) Prior Publication Data

US 2017/0157505 A1 Jun. 8, 2017

(51) Int. Cl.
  *A63F 13/40* (2014.01)
  *A63F 13/57* (2014.01)
  *A63F 13/80* (2014.01)

(52) U.S. Cl.
  CPC .............. *A63F 13/40* (2014.09); *A63F 13/57* (2014.09); *A63F 13/80* (2014.09)

(58) Field of Classification Search
  CPC ........... A63F 13/40; A63F 13/80; A63F 13/57
  See application file for complete search history.

(56) References Cited

U.S. PATENT DOCUMENTS

| | | | |
|---|---|---|---|
| 2014/0235338 A1* | 8/2014 | Hansson | G07F 17/32 463/31 |
| 2015/0343305 A1* | 12/2015 | Cirlig | A63F 13/80 463/31 |

* cited by examiner

*Primary Examiner* — Kang Hu
*Assistant Examiner* — Thomas H Henry
(74) *Attorney, Agent, or Firm* — Saul Ewing Arnstein & Lehr LLP

(57) ABSTRACT

A computer device has a display which displays game elements. The game element being one of a plurality of different types and having a weight. A user interface detects when a user engages with a game element. If there is a match associated with the game element, the weights of the all the match game elements is summed. If the weight is above a threshold, the engaged game element is removed from the game board. The weight is distributed to other game elements.

31 Claims, 8 Drawing Sheets

COMPUTER DEVICE AND METHOD

FIELD OF THE INVENTION

The present disclosure relates to controlling displayed elements responsive to user engagement with displayed elements via an interface of a computer device. The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

SUMMARY OF THE INVENTION

According to an aspect, there is provided a computer device comprising: a display configured to display user actuatable game elements in a game board of tiles, each game element being one of a plurality of different types and having a weight; a user interface configured to detect user input when a user engages with a game element; at least one processor configured to: receive information associated with the detected user input; responsive to a match game condition associated with the engaged game element, summing together the weights of all the game elements satisfying the match condition; comparing the summed weight to a threshold; and in dependence on the comparing, determining if the engaged game element is to be removed from the game board; the device further comprising a graphics rendering component operable to render the game elements on the display, each game element having a graphical representation dependent on its type, wherein the graphics rendering component is responsive to determining by the at least one processor that the engaged game element is to be removed such that the engaged game element is removed from the game elements displayed by the display.

The at least one processor may be configured to determine when said summed weight is below a threshold to update a weight of said engaged game element to said summed weight.

The at least one processor may be configured to determine when said summed weight is above a threshold to remove said engaged game element from the game board.

The at least one processor may be configured to distribute at least some of said summed weight to at least one other game element.

The at least one processor may be configured to distribute at least some of said summed weight to at least one other game element of the same type as said engaged game element.

The at least one processor may be configured to distribute at least some of said summed weight to at least one other game element of the different type as said engaged game element, if there are no game elements of the same type as the engaged game element.

The at least one processor may be configured to reduce said summed weight by a defined amount before distributing said reduced summed weight.

The at least one processor may be configured to check for game elements within a given distance of a position associated with the engaged game element to which said at least some of the summed weight is to be distributed.

The at least one processor may be configured to check for game elements within a larger given distance of the position if there are no game elements within said given distance.

If said at least one processor determines that there is two or more game elements to which the summed weight is to be distributed, said at least processor may be configured to share said summed weight using a round robin technique.

The at least one processor may be configured to detect a match condition when at least two game elements of the same type as the engaged game element are provided in at least one of a column and a row of said game board in which said engaged game element is provided.

The at least one processor may be configured to cause said game elements associated with the match condition other than said engaged game element to be removed from the game elements displayed by said display in response to said match condition.

The graphics rendering component may be configured to provide a graphical representation of a weight associated with a respective game element.

The weight may comprise integer values of a range of possible weight values.

The user interface and the display may be provided by a touch screen.

According to another aspect, there is provided a computer implemented method comprising: displaying by a display user actuatable game elements in a game board of tiles, each game element being one of a plurality of different types and having a weight; detecting user input at a user interface when a user engages with a game element; receiving by at least one processor information associated with the detected user input; responsive to a match game condition associated with the engaged game element, summing together, by said at least one processor, the weights of all the game elements satisfying the match condition; comparing, by said at least one processor, the summed weight to a threshold; in dependence on the comparing, determining, by said at least one processor, if the engaged game element is to be removed from the game board; and rendering the game elements on the display, each game element having a graphical representation dependent on its type, wherein the rendering is responsive to determining by the at least one processor that the engaged game element is to be removed such that the engaged game element is removed from the game elements displayed by the display.

The method may comprise, determining, by the at least one processor, when said summed weight is below a threshold to update a weight of said engaged game element to said summed weight.

The method may comprise, determining, by the at least one processor, when said summed weight is above a threshold to remove said engaged game element from the game board.

The method may comprise, distributing, by the at least one processor, at least some of said summed weight to at least one other game element.

The method may comprise, distributing, by the at least one processor, at least some of said summed weight to at least one other game element of the same type as said engaged game element.

The method may comprise, distributing, by the at least one processor, at least some of said summed weight to at least one other game element of the different type as said engaged game element, if there are no game elements of the same type as the engaged game element.

The method may comprise, reducing, by the at least one processor, said summed weight by a defined amount before distributing said reduced summed weight.

The method may comprise, checking, by the at least one processor, for game elements within a given distance of a position associated with the engaged game element to which said at least some of the summed weight is to be distributed.

The method may comprise, checking, by the at least one processor, for game elements within a larger given distance of the position if there are no game elements within said given distance.

The method may comprise, determining, by the at least one processor, if there is two or more game elements to which the summed weight is to be distributed, sharing said summed weight using a round robin technique.

The method may comprise, detecting, by the at least one processor, a match condition when at least two game elements of the same type as the engaged game element are provided in at least one of a column and a row of said game board in which said engaged game element is provided.

The method may comprise, causing, by the at least one processor, said game elements associated with the match condition other than said engaged game element to be removed from the game elements displayed by said display in response to said match condition.

The rendering may provide a graphical representation of a weight associated with a respective game element.

The weight may comprise integer values of a range of possible weight values.

According to another aspect, there is provided a computer program product, comprising a computer readable storage device having a computer readable program code stored therein, said computer readable program code containing instructions configured to be executed by at least one processor to implement a method, said method comprising: displaying user actuatable game elements in a game board of tiles, each game element being one of a plurality of different types and having a weight; detecting user input when a user engages with a game element; receiving information associated with the detected user input; responsive to a match game condition associated with the engaged game element, summing together the weights of all the game elements satisfying the match condition; comparing the summed weight to a threshold in dependence on the comparing, determining if the engaged game element is to be removed from the game board; and rendering the game elements on the display, each game element having a graphical representation dependent on its type, wherein the rendering is responsive to determining that the engaged game element is to be removed such that the engaged game element is removed from the game elements displayed by the display.

A computer program comprising program code means adapted to perform the method(s) may also be provided. The computer program may be stored and/or otherwise embodied by means of a carrier medium.

A further aspect provides computer program products for implementing the afore-defined methods.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which.

DETAILED DESCRIPTION OF EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

It should be appreciated that there are different approaches to implementing the game is not exhaustive, what is described herein are certain preferred embodiments. It is possible to implement the way in a number of variations without departing from the spirit or scope of the invention.

Figure 2:
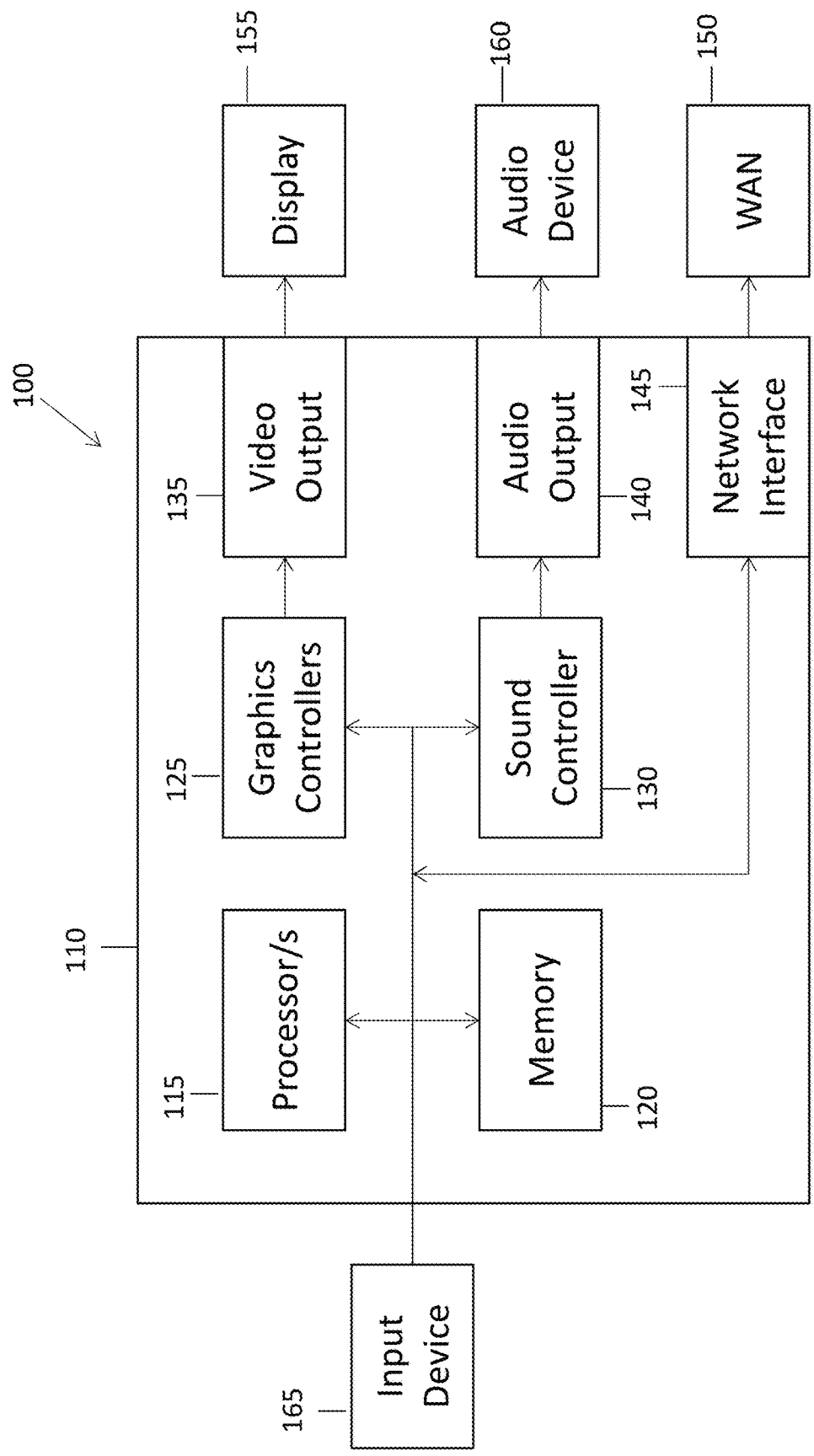
FIG. 2 shows an example user device in which some embodiments may be provided.
Figure 3:
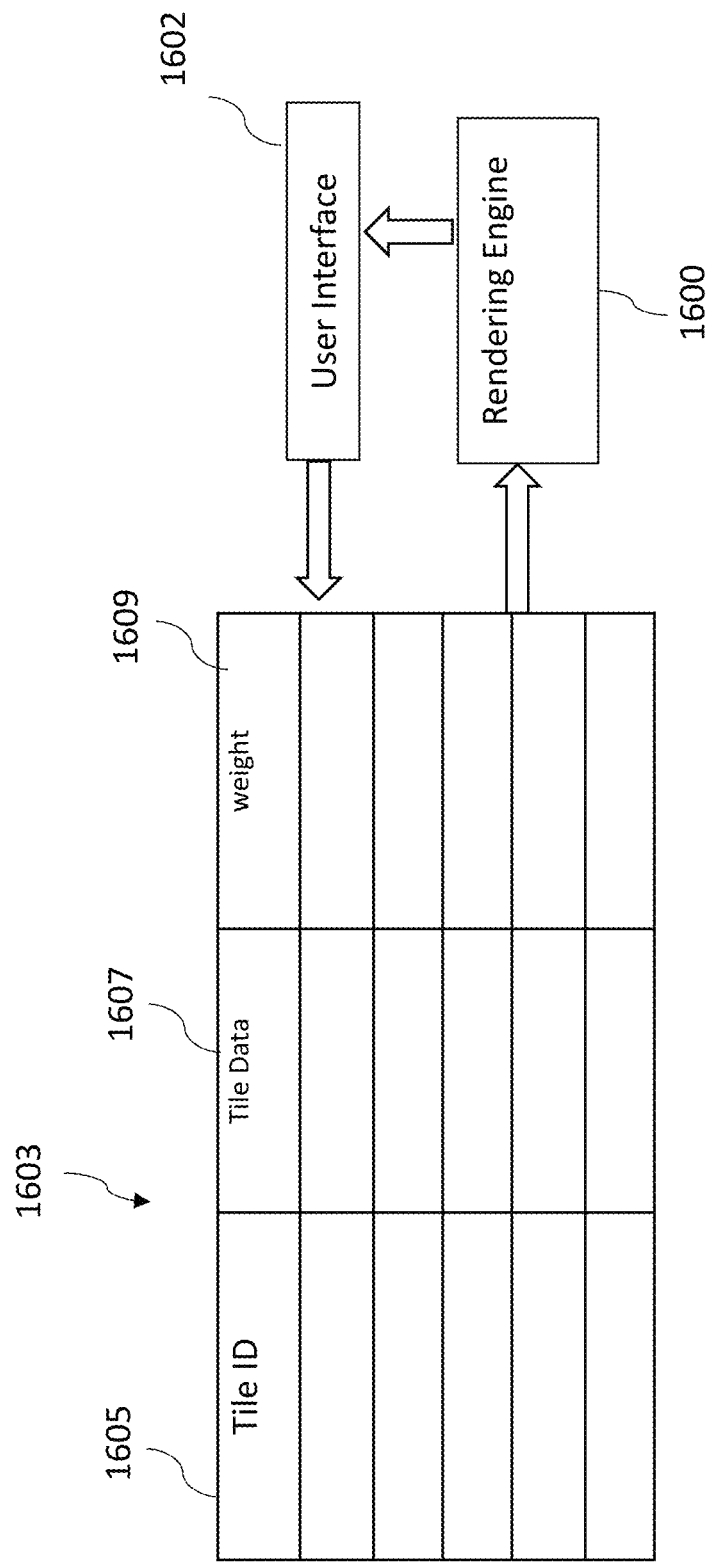
FIG. 3 schematically shows a data structure for managing tile data, showing the interrelation between the data structure and a rendering engine of a graphics controller.

A schematic view of a user device 100 according to an embodiment is shown in FIG. 2. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 1:
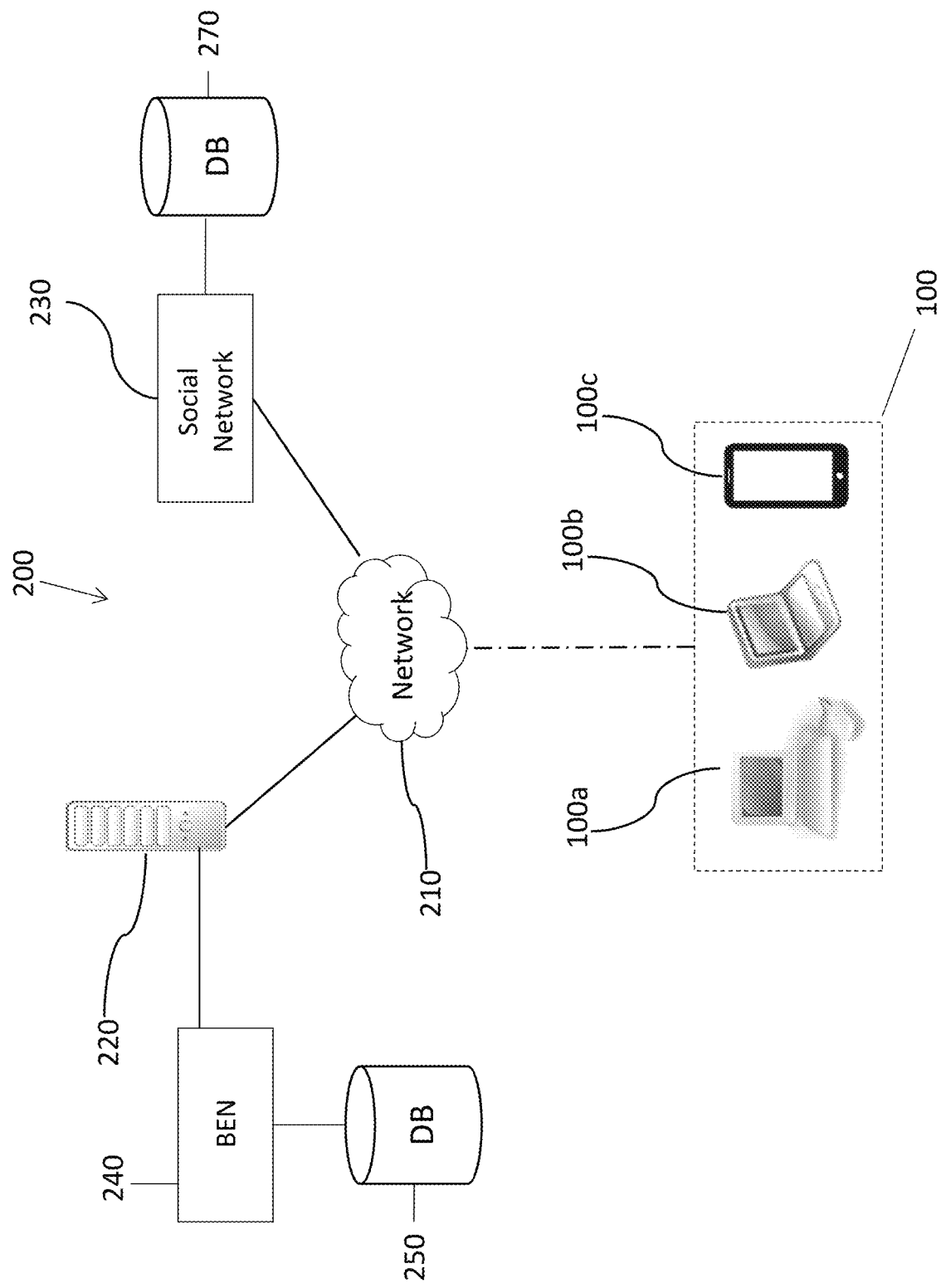
FIG. 1 shows an example system in which some embodiments may be provided.

FIG. 1 schematically shows a system 200 according to an embodiment. The system 200 comprises a server 220 which may store or be in communication with database 250 which may be, in some embodiments, be connected to a back end infrastructure (BEN) of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory to store the computer game program, user behaviour data and a processor 115 to run the games program and process the user behaviour data.

The server 220 may communicate via, for instance, the internet 210 to one or more client or user devices 100, shown in FIG. 13 by way of example as user devices 100*a*, 100*b* and 100*c*, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 5:
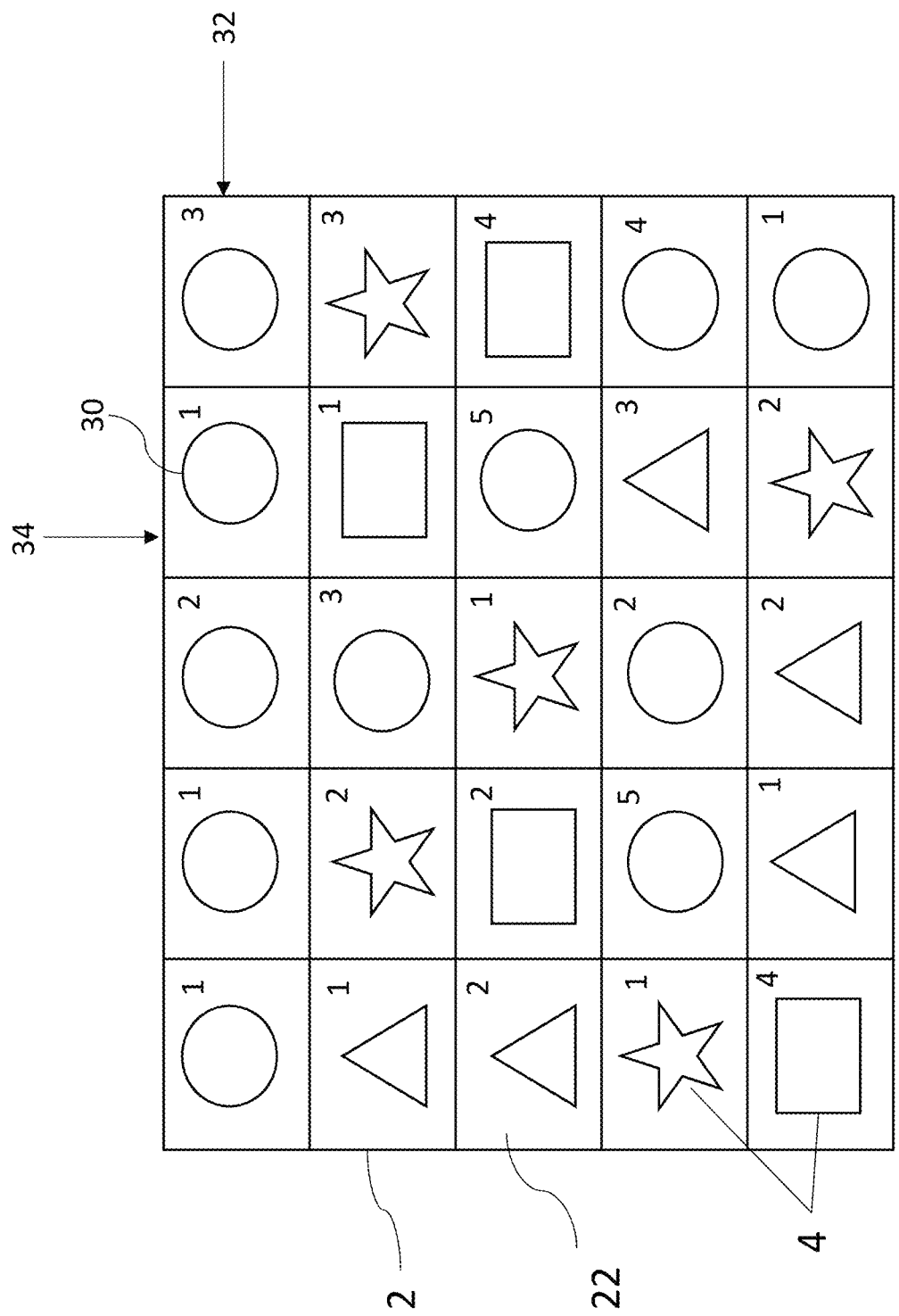
FIG. 5 is a schematic diagram of an example game board.

Reference is made to FIG. 5 which shows a game board 2 with a plurality of game elements 4. Each game element is supported by a tile 22. The game elements, in the example shown can be one of four different types. In different embodiments or levels there may be more or less than four different types of game elements.

The different types of game element may be displayed in a visually distinctive manner. By way of example only, the different types of game elements may have one or more characteristics which together are used to define a type. For example, the characteristic may be one or more of a colour and/or shape. In some embodiments, the game elements of a particular type will have a particular shape and colour. In the example shown in FIG. 5, the game elements have been shown as having different shapes and may have optionally have differing colours or the like.

It should be appreciated that different types of shape may be used in different embodiments. For example, in FIG. 8, an example of a game element is shown where the game element is represented as a bottle having a particular shape. In some embodiments, the different game element types may each have a respective different bottle shape as a characteristic. Additionally, each of the bottle shaped game elements may be associated with a respective different colour as another characteristic.

In some embodiments, each game element is associated with weight information. In one example, a game element can have a weight of an integer between 1 and 6 inclusive. In different embodiments, the weight may have integer values between 1 or 0 and N (inclusive) where N is an integer equal to or greater than 2.

In the described embodiments, the weight will be described as being in integer. However, in other embodiments, a weighting may have a non-integer values. Other embodiments may use different representations for the weighting, such as a percentage representation, a fractional representation or decimal representation.

In some embodiments, different types of game element may use the same weighting range. In some embodiments, one or more of the different types of game elements may have different weighting ranges. For example one type of game element may have a range of 1 to 6 and another may have a range of 1 to 4.

Figure 8:
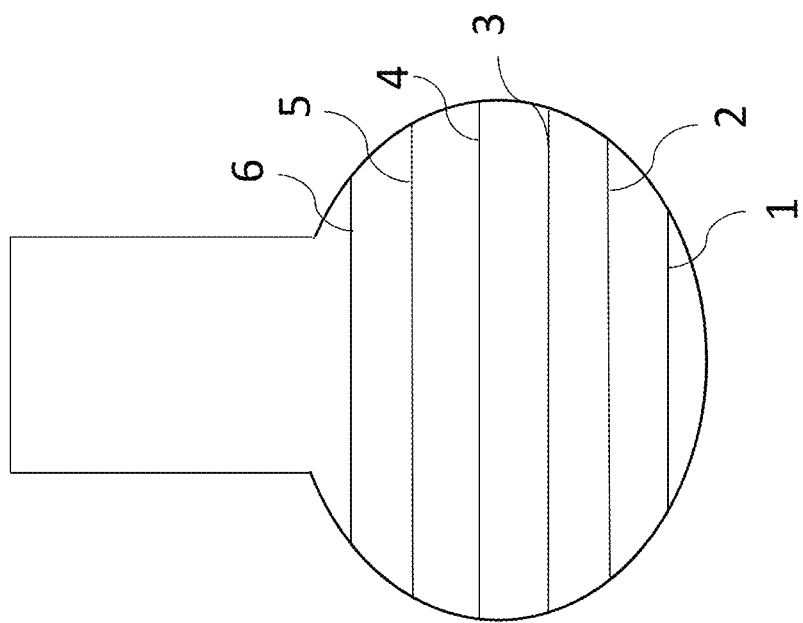
FIG. 8 schematically shows a graphical representation of a game element of some embodiments.

In the example shown in FIG. 5, the weighting is indicated as an integer on the tile associated with the respective game element. This is only one way of graphically representing that weighing information. Any other suitable method of graphically representing that information may alternatively be used. For example, going to the example of the game element shown in FIG. 8, the weighting may be represented as a level of a liquid in the bottle. The amount of liquid in the vessel may reflect the weighting associated with the game element. For example, each of the weighting levels 1 to 6 is shown in FIG. 8. When the weighting is 6, the bottle will appear to be full of liquid whereas if the weighting is one, the bottle will appear to have only a small amount of liquid.

In some embodiments, the colour of the liquid in the bottle will be different for different types of game element.

In one example the user is able to select one of the game elements. To illustrate an embodiment, the selected game element is referenced 30. This game element is shown as having a 'circular' shape. Thus, in the example shown in FIG. 5, the game element referenced 30 has been selected by the user. The game board is a 5×5 grid having five rows and five columns. It should be appreciated that this is by way of example only and the grid may be bigger or smaller than the example shown in FIG. 5.

The selected game element of 30 is in the first row 32 of the grid and the fourth column 34 of the grid. The game elements may be selected by any suitable user input. Where the game board is displayed on a touch screen, the game element 30 may be selected by the user simply touching the position at which the game element is displayed. Of course, in different devices, the game element 30 may be selected by a pointer or similar device.

Figure 6:
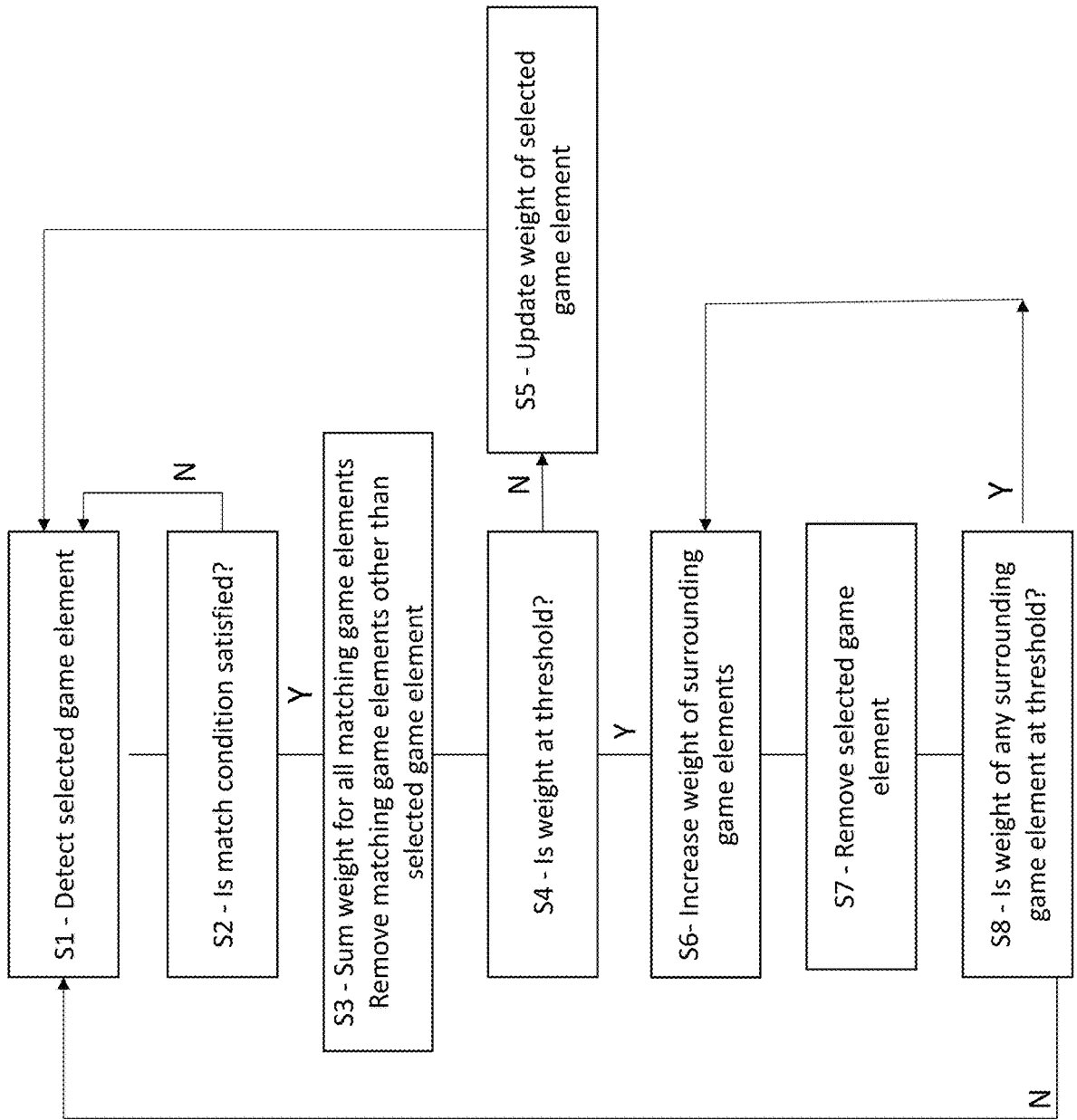
FIG. 6 is a flow chart showing steps performed by a user device after a game element is selected.

When the game element 30 is selected, a method such as shown in FIG. 6 may be performed. This method will now be described.

In step S1, it is detected that a game element has been selected.

In step S2, a check is made to see whether or not a match condition is satisfied. In the example game which is described, a match condition is considered to occur if there are three or more game elements of the same type as the selected game element in the row and column of the selected game element. It should be noted that the game elements of the same type do not need to be adjacent to the selected game element but merely need to be in the same row and column. For example, a selected game element may have one additional game element in the same row of the same type and an additional game element of the same type in the same column. That would mean that there was a total of three game elements of the same type and as such, the match condition would be determined to be satisfied.

In the example shown, there are in fact four other game elements of the same type in the same row as the selected game element and one additional game element of the same type in the same column as the selected game element.

If the match condition is not satisfied, the method loops back to step S1. If the match condition is satisfied, the method goes to step S3. In step S3, the game elements making up the match, but excluding the selected game element may be removed from the game board at this time. In some embodiments, the game elements making up the match may be removed later, for example in step S4 or later. The other game elements of the same type as the selected game element and in the same row and same column are thus removed from the game board. The game board will be re-filled using any suitable mechanism from any suitable direction. In some embodiments, once a particular type of game element has been completely removed from that game board, that type of game element is no longer provided as a refill element. In some embodiments, once there is only one type of game element present on the game board, there will be no refilling of the game board to allow the last type of game elements to be removed from the game board.

In step S3, the weight for all of the game elements of the same type as the selected game element and on the same row or column is summed (including the selected game element itself). In this example, this would give a sum of 1+1+2+1+3+5. It should be appreciated that the weight of the selected game element is included.

In step S4, it is determined whether the summed weight is at a threshold value or greater. For example, the summed weight can be compared to see whether or not it is the same as a threshold value or is greater than the threshold value. In the described embodiment, the threshold value is defined as greater than 6.

If the weight is less than the threshold value, then the next step is step S5. This will update the weight of the selected game element so as to be the summed weight.

If the summed weight associated with the selected game element is at or above the threshold, the next step is step S6. In step S6, the weight of the surrounding game elements is increased using the weight from the selected game element. In some embodiments, this will be the surrounding game elements of the same type as the selected game element. In some embodiments, if there are no game elements of the same type available then the weights of game elements of a different type to the selected game element may be increased.

In step S7, the selected game element is removed. In some embodiments, steps S6 and S7 may generally take place at the same time.

In some embodiments, a visual indication indicating the weighting may be updated before the game element is removed (e.g. the weighting number displayed increased or the liquid level in a bottle changed) so as to give the user some feedback that the weighting has met or exceeded the threshold.

In step S8, it is determined if the weight of any of the surrounding game elements, which has had its weight increased in step S7, is at the threshold or greater. If so, the method loops to step S6. If not, the method loops back to step S1.

Figure 7:
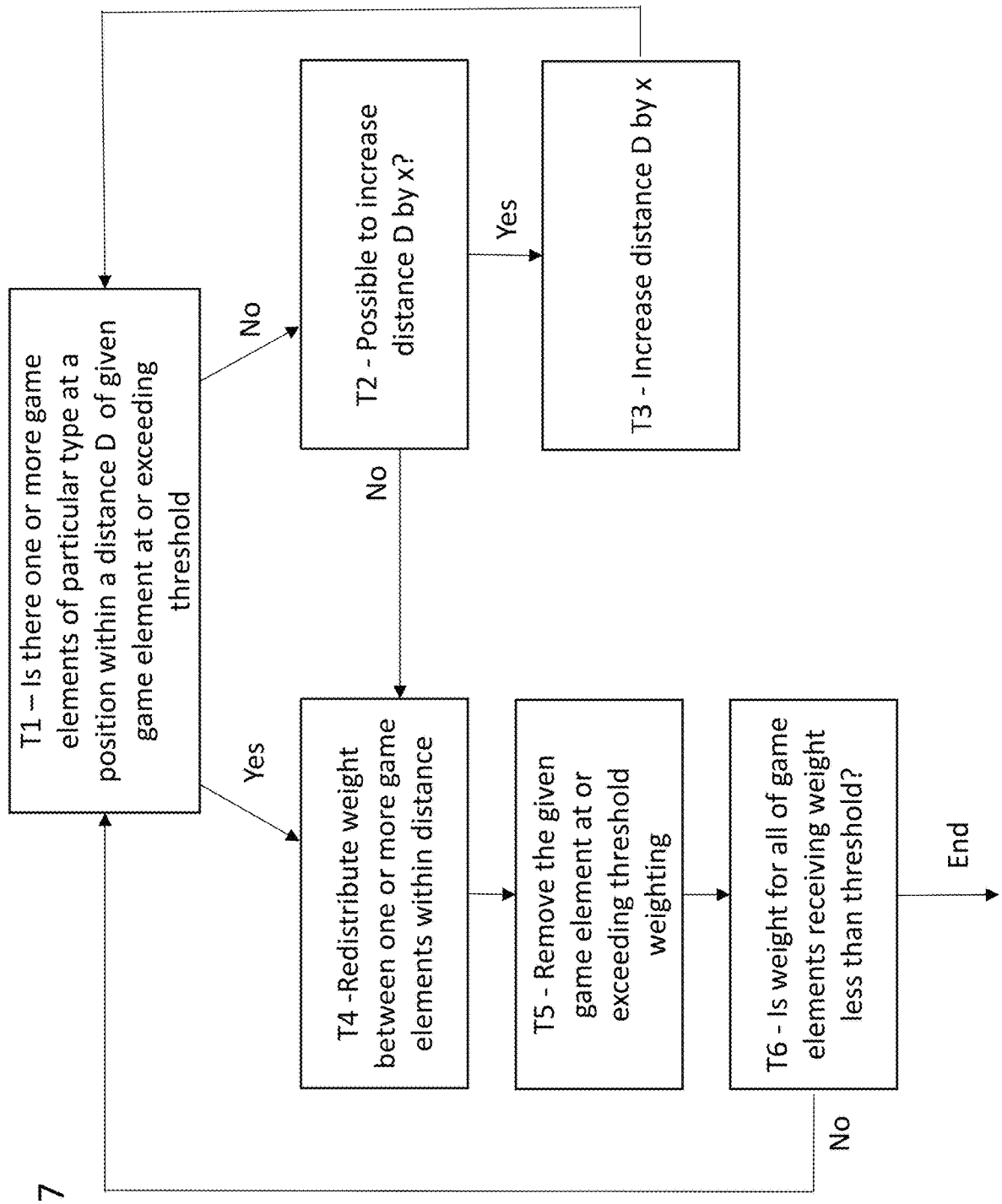
FIG. 7 is a flow chart showing in more detail the method for redistribution of weights.

Reference is now made to FIG. 7 which shows in more detail one method of implementing steps S6 to S8.

In the step T1, it is determined if there one or more game elements of a particular type at a position within a distance D of the position of the game element at or exceeding the threshold. Initially the game element will be the selected game element, selected by the user. Initially, it is determined if there is one or more game elements of the same type as the selected game element at a position within a distance D of the selected game element position. D may be one position or one move. For example, if the selected game element was in the second row and fourth column, the third, four and fifth game elements in the first and third rows and the third and fifth game elements on the second row would all be within one position of the selected game element.

In some embodiments, the selected game element may be displayed until the weight has been transferred to one or more other game elements It should be appreciated that in other embodiments the selected game element may no longer be displayed but the reference to the position of the selected game element when it is removed from the game board is used.

Step T4 will follow step T1 if the determination is that there are one or more game elements of the particular type within a distance D of the position of the selected game element. In the step T4, the summed weight is redistributed between the one or more game elements within the distance. In other words, the sum of weight will be redistributed between the one or more game elements.

In some embodiments, the summed weight may be reduced in by a certain amount to keep the chain reactions under control. In this case, the reduced weight is redistributed. However, this is optional. In some embodiments, the weight may be reduced by multiplying the summed weight by a factor to thereby reduce the summed weight. In other embodiments the weight may be reduced by subtracting a given amount to thereby reduce the summed weight. Other techniques may alternatively be used to reduce the summed weight before redistribution of the remaining summed weight.

In some embodiments, a round robin type of technique will be used to redistribute the weights between the game elements of the particular type, if the case there are two or more game elements. The round-robin techniques will ensure that there is more or less even distribution of the weighting, although depending on the weighting, each game element may not receive the exact same weight. For example, if the weight to be redistributed is 5 and there are three game elements, two game elements will receive a weighting of 2 and one game element will receive a weighting of 1. It should be appreciated that in other embodiments, the weighting may be always equally divided. However, those embodiments may be ones which do not require the weights to be integer values.

In step T5, the given game element is removed. Alternatively, this may be removed earlier than this, in some embodiments.

In step T6, a determination is made for the or each of the game elements which has received extra weight or all the game elements to see whether or not the weight is at the threshold or above. If all of the game elements on the game board are below the threshold, the method ends and effectively goes back to step S1.

If yes, the next step is step T1. Step T6 will thus be followed by step T1 but in this case the given game element would be one which received weight, the weight of which is at or exceeds the threshold. This may be carried out for each of the game elements which as a result of the redistribution of the weight is at or above the threshold. The distance is reset to D again.

If it is determined in step T1, that there is no game elements of the particular type within the distance D, then the next step is step T2. In this step, it is determined if the distance can be increased by X. As this is an iterative method, the method may have increased the distance to a limit. That limit may be when the entire game board is covered by the increase in distance or the limit may be defined by a multiple number of x. The multiple may for example be 1 or more. In some embodiments the multiple may be 3 or the like. At that limit, it is not possible to further increase the distance by x. In that case the method may loop to step T4. In this scenario, one or more or any of the other types of game element may then be candidates for receiving the summed weight. For example the weight is distributed to the closest game elements to the selected game element, regardless of type. In some embodiments, the value of D (without any incrementing) may be used to determine which game elements are to receive the weight.

In some embodiments, the method may be repeated for each type of game element in turn. In other embodiments, two or more of the types of game element will be potentially be candidates at the same time to receive the summed weight.

If the distance can be increased, then the next step is step T3 where the distance is increased by x. For example this may increase D by one move to give a distance of 2 moves. Accordingly, additionally the first to fourth game elements of the second column and the third to fifth game elements of the fourth row would be candidates.

Step T3, would then loop back to step T1, with the distance being D+x

It should be appreciated that if the method is repeated and all of the game objects of a particular type had been removed, the weight will be distributed to one or more game elements of a different type, In an alternative embodiment, instead of first redistributing weight to game elements of the same type, the redistribution may be to any type of game element, with distance being used as a selection criteria for the candidate game elements.

In some embodiments, there may be a modular order of the game element types. For example if the game element types are A, B, C, D, and all of game elements A are removed, then the weighting is transferred to game element type B. Likewise, if all of game elements B are removed, the weighting is transferred to game element C. Likewise, if all of game elements C are removed, the weighting is transferred to game element D. If all of game elements D is removed, then the weighting is transferred to game element A. In other embodiments, the next game element type to be selected may be done at random.

In other embodiments, different criteria can be used to establish whether or not a match has been made.

In alternative embodiments, only game elements in the same row or the same column may be considered. In other embodiments, one or more diagonal rows may be used to determine if a match condition exists.

Some embodiments may require three all more game elements of the same characteristic to be provided in a line in order for there to be a match.

Different mechanisms may be used in different games. For example, some embodiments may use a switch mechanic where one game element is moved in order to make a match. Other embodiments may require the clicking of one or more game elements or the sliding of a row or column of game elements. Rules may be defined for determining which game element in a match is considered to be the selected or base game element.

It should be appreciated that in other embodiments, the game may thus use any type of match mechanic such as switching, sliding or linking.

It will be understood that each tile has a game board position, but game elements are removed and replaced over the tiles.

It should be appreciated that in different embodiments, different types of game board may be used. For example hexagonal or circular game boards may be provided. Those game boards may not have the rows and columns of the grid used in some embodiments. Accordingly, a different criteria may be used to determine if a match condition occurs.

It should be appreciated that the specific values for the weighting are by of example only and different values and relative weighting may be used in other embodiments.

It should be appreciated that one or more of the method steps of FIGS. 6 and 7 may be performed by at least one processor of the computer device. Different embodiments may use the steps in any other suitable order.

The method may be performed by a computer program comprising computer executable instructions. The computer program may be stored in one or more memory of the computer device. The computer program may be run by one or more processors of the computer device.

FIG. 13 illustrates a data structure which schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each tile has a tile ID 1605. The tile ID 1605 can define the position on the user interface where the tile is to be positioned. This allows the rendering engine 1600 to generate that tile at an appropriate position on the user interface display 1602. Each tile ID 1605 is associated with tile data 1607 which defines what type of game element it has associated with it, and the weight 1609 of that game element.

After a move has been made or there has been some change to the game board, the game engine will update this data such that updated tile image will be rendered by the rendering engine and displayed.

Figure 4:
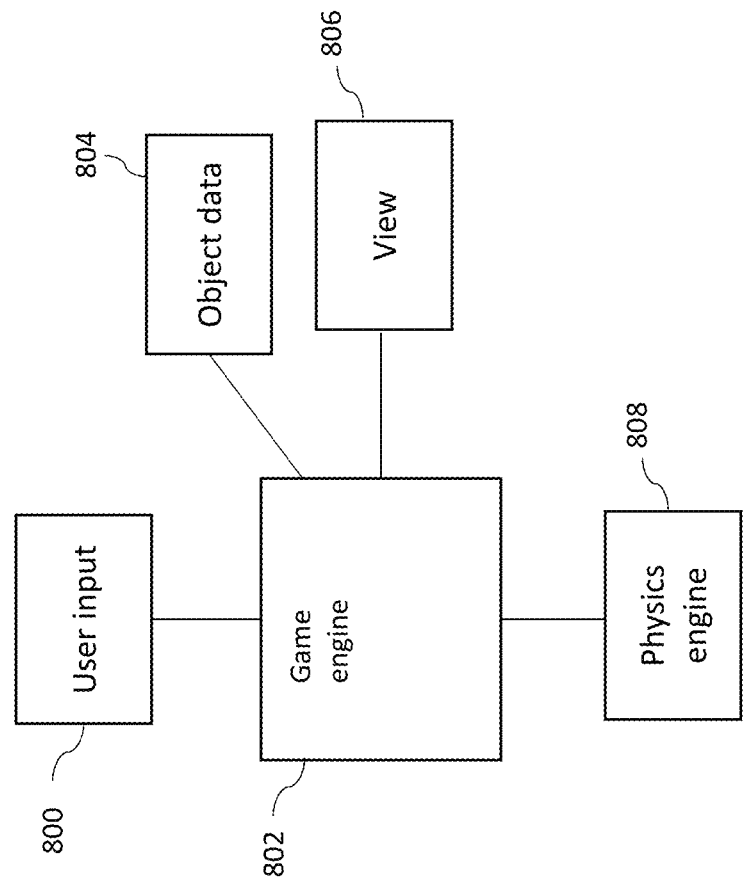
FIG. 4 is a schematic diagram showing the modules and functions associated with carrying out the operating of embodiments.

Reference is made to FIG. 4 which schematically shows the functional blocks of an embodiment, which may enable game play such as discussed previously. A user input block 800 is shown. This captures the user input and feeds the input to a game engine 802. This user input can be via any suitable user interface, such as discussed earlier.

The game engine 802 will process the information provided by the user input. The game engine 802 (for example a game model) will determine if a valid combination has been made.

Each game element has object data associated therewith. The object data 804 may be stored in any suitable memory location. In some embodiments, the object data may be provided by the data structure described previously. In some embodiments, the object data may be considered to be part of the game engine and in other embodiments may be considered to be outside the game engine. The object data may provide information as to the properties of a game element.

In some embodiments, the game engine will check if the game element satisfies the rule or rules for a valid match. The rule or rules which define whether or not a match condition has been satisfied. The match condition will be dependent on the game.

Thus, the game engine will be in control of the matching mechanism. The game engine will have access to data for each game including its position and the at least one characteristic associated with the game element and will be able to determine if a match condition has been met. If a match condition is met, the game elements in the match may be removed.

The game elements may be any suitable game element and in some embodiments may be letters. In that scenario a match will occur when the letters match a word. Preferably the word is at least three letters long.

A physics engine 808 is provided which is configured to control the movement of moving game elements on the display.

The physics engine 808 may be part of the game engine 802.

A view function 806 uses of the object data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

It should be appreciated that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device having:
    a display configured to display user actuatable game elements, of a computer implemented game, in a game board of tiles each game element being one of a plurality of different types and having a weight that can vary during playing of said computer implemented game;
    a user interface configured to detect user input when a user engages with a game element;
    at least one processor configured to:
    receive information associated with the detected user input;
    responsive to determining that a match game condition associated with the engaged game element has been satisfied, summing together weights of all the game elements satisfying the match game condition;
    comparing the sum of the weights to a threshold; and
    in dependence on the comparing, determining if the engaged game element is to be removed from the game board;
    the computer device further comprising a graphics rendering component operable to render the game elements on the display, each game element having a graphical representation dependent on its type, wherein the graphics rendering component is responsive to determining by the processor that the engaged game element is to be removed such that the engaged game element is removed from the game elements displayed by the display.

2. A computer device as claimed in claim 1, wherein at least one processor is configured to determine when said sum of the weights is below the threshold to update a weight of said engaged game element to said summed weight.

3. A computer device as claimed in claim 1, wherein said at least one processor is configured to determine when said sum of the weights is above a threshold to remove said engaged game element from the game board.

4. A computer device as claimed in claim 1, wherein said at least one processor configured to distribute at least some of said sum of the weights to at least one other game element.

5. A computer device as claimed in claim 4, wherein said at least one processor is configured to distribute at least some of said sum of the weights to at least one other game element of a same type as said engaged game element.

6. A computer device as claimed in claim 4, wherein said at least one processor is configured to distribute at least some of said sum of the weights to at least one other game element of a different type as said engaged game element, if there are no game elements of a same type as the engaged game element.

7. A computer device as claimed in claim 4, wherein said at least one processor is configured to reduce said sum of the weights by a defined amount before distributing said reduced sum of the weights.

8. A computer device as claimed in claim 4, wherein said at least one processor is configured to check for game elements within a given distance of a position associated with the engaged game element to which said at least some of the sum of the weights is to be distributed.

9. A computer device as claimed in claim 8, wherein said at least one processor is configured to check for game elements within a larger given distance of the position if there are no game elements within said given distance.

10. A computer device as claimed in claim 4, wherein if said at least one processor determines that there are two or more game elements to which the sum of the weights is to be distributed, said at least processor is configured to share said sum of the weights using a round robin technique.

11. A computer device as claimed in claim 1, wherein said at least one processor is configured to detect a match condition when at least two game elements of a same type as the engaged game element are provided in at least one of a column and a row of said game board in which said engaged game element is provided.

12. A computer device as claimed in claim 1, wherein said at least one processor is configured to cause game elements associated with the match condition other than said engaged game element to be removed from the game elements displayed by said display in response to said match condition.

13. A computer device as claimed in claim 1, wherein said graphics rendering component is configured to provide a graphical representation of a weight associated with a respective game element.

14. A computer device as claimed in claim 1 wherein said weight comprise integer values of a range of possible weight values.

15. A computer device as claimed in claim 1, wherein the user interface and the display are provided by a touch screen.

16. A computer implemented method comprising:
displaying by a display user actuatable game elements, of a computer implemented game, in a game board of tiles, each game element being one of a plurality of different types and having a weight that can vary during playing of said computer implemented game;
detecting user input, at a user interface, when a user engages with a game element;
receiving, by at least one processor, information associated with the detected user input;
responsive to determining that a match game condition associated with the engaged game element has been satisfied, summing together, by said at least one processor, weights of all the game elements satisfying the match game condition;
comparing, by said at least one processor, the sum of the weights to a threshold;
in dependence on the comparing, determining, by said at least one processor, if the engaged game element is to be removed from the game board; and
rendering the game elements on the display, each game element having a graphical representation dependent on its type, wherein the rendering is responsive to determining by the at least one processor that the engaged game element is to be removed such that the engaged game element is removed from the game elements displayed by the display.

17. A non-transitory computer program product, comprising a computer readable storage device having a computer readable program code stored therein, said computer readable program code containing instructions configured to be executed by at least one processor to implement a method, said method comprising:
displaying, by a display, user actuatable game elements, of a computer implemented game, in a game board of tiles, each game element being one of a plurality of different types and having a weight that can vary during playing of said computer implemented game;
detecting user input when a user engages with a game element;
receiving information associated with the detected user input;
responsive to determining that a match game condition associated with the engaged game element has been satisfied, summing together weights of all the game elements satisfying the match game condition;
comparing the sum of the weights to a threshold;
in dependence on the comparing, determining if the engaged game element is to be removed from the game board; and
rendering the game elements on the display, each game element having a graphical representation dependent on its type, wherein the rendering is responsive to determining that the engaged game element is to be removed such that the engaged game element is removed from the game elements displayed by the display.

18. The method as claimed in claim 16, comprising determining when said sum of the weights is below the threshold to update a weight of said engaged game element to said sum of the weights.

19. The method as claimed in claim 16, comprising determining when said sum of the weights is above the threshold to remove said engaged game element from the game board.

20. The method as claimed in claim 16, comprising distributing at least some of said sum of the weights to at least one other game element.

21. The method as claimed in claim 20, comprising distributing at least some of said sum of the weights to at least one other game element of a same type as said engaged game element.

22. The method as claimed in claim 20, comprising distributing at least some of said sum of the weights to at least one other game element of a different type as said engaged game element, if there are no game elements of a same type as the engaged game element.

23. The method as claimed in claim 20, comprising reducing said sum of the weights by a defined amount before distributing said reduced sum of the weights.

24. The method as claimed in claim 20, comprising checking for game elements within a given distance of a position associated with the engaged game element to which said at least some of the sum of the weights is to be distributed.

25. The method as claimed in claim 24, comprising checking for game elements within a larger given distance of the position if there are no game elements within said given distance.

26. The method as claimed in claim 20, wherein if it is determined that there are two or more game elements to which the sum of the weights is to be distributed, the method comprises sharing said sum of the weights using a round robin technique.

27. The method as claimed in claim 16, comprising detecting a match condition when at least two game elements of a same type as the engaged game element are provided in at least one of a column and a row of said game board in which said engaged game element is provided.

28. The method as claimed in claim 16, comprising causing game elements associated with the match condition other than said engaged game element to be removed from the game elements displayed by said display in response to said match condition.

29. The method as claimed in claim 16, comprising providing a graphical representation of a weight associated with a respective game element.

30. The method as claimed in claim 16, wherein said weight comprise integer values of a range of possible weight values.

31. The method as claimed in claim 16, wherein the user interface and the display are provided by a touch screen.

\* \* \* \* \*